Inventor
Sterling P. Newberry
by I. David Blumenfeld
His Attorney

INFORMATION STORAGE SYSTEM

Original Filed Aug. 25, 1958 2 Sheets-Sheet 2

Inventor
Sterling P. Newberry
by I. David Blumenfeld
His Attorney

United States Patent Office 3,008,066

Patented Nov. 7, 1961

3,008,066

INFORMATION STORAGE SYSTEM

Sterling P. Newberry, Schenectady, N.Y., assignor to General Electric Company, a corporation of New York Continuation of application Ser. No. 757,082, Aug. 25, 1958. This application May 19, 1960, Ser. No. 30,723
8 Claims. (Cl. 315—8.5)

This invention is a continuation of my copending application Serial No. 757,082, filed August 25, 1958, now abandoned, and assigned to the assignee of the present invention.

This invention relates to an information storage system and more particularly, to a system utilizing a thermoplastic storage medium.

Apparatus, method and medium for recording information in the form of deformations of a light-controlling medium having a thermoplastic layer, and embodying prior inventions of W. E. Glenn, Jr., described and claimed in copending application Serial No. 8,842, filed February 15, 1960, entitled "Method and Medium for Recording," and filed as a continuation-in-part of Glenn, Jr., application Serial No. 698,167, filed November 22, 1957, entitled "Method and Apparatus for Electronic Recording," and Glenn, Jr., application Serial No. 783,584, filed December 29, 1958, entitled "Thermoplastic System," which application Serial No. 783,584 is a continuation-in-part of application Serial No. 698,167. All of the above applications are assigned to the assignee of the present application. As disclosed and claimed in the aforesaid Glenn, Jr., application Serial No. 8,842, information to be recorded is established as corresponding electric charge patterns on the surface of a recording medium which is rendered deformable and then returned to a solid state to preserve the deformations.

In a specific embodiment of the invention described and claimed by Glenn, Jr., in application Serial No. 8,842, the charge pattern is established on a thermoplastic film by means of an electron beam containing the information to be stored and the charge pattern converted to thickness deformations by heating the thermoplastic film to a liquid state by means of high frequency electrical energy coupled to a conducting layer underlying the thermoplastic film and restoring the film to a solid state to preserve the deformations.

In utilizing thermoplastic storage in high density memories and in conjunction with computing devices, high speed in writing and erasing of information is desirable. The invention of the present application is an improvement over the prior inventions disclosed and claimed in the above identified Glenn, Jr., applications and has as its objective the achievement of high speed storage by writing and heating at the same physical location by means of an improved compound lens construction.

Still another object of this invention is to provide a unitary structure which alternately controls an electron writing beam and heats the thermoplastic without intereffects of these functions.

Other objects and advantages will become apparent as the description of the invention proceeds.

The above objects are carried out in one embodiment of the invention by providing a composite objective lens structure which includes a pair of radio frequency heating electrodes as elements of the lens assembly. These electrodes are so shaped and so positioned that they have no deleterious effect on the lens field and the electron beam during electron deposition.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figures 1, 2, 3, 4, 5:
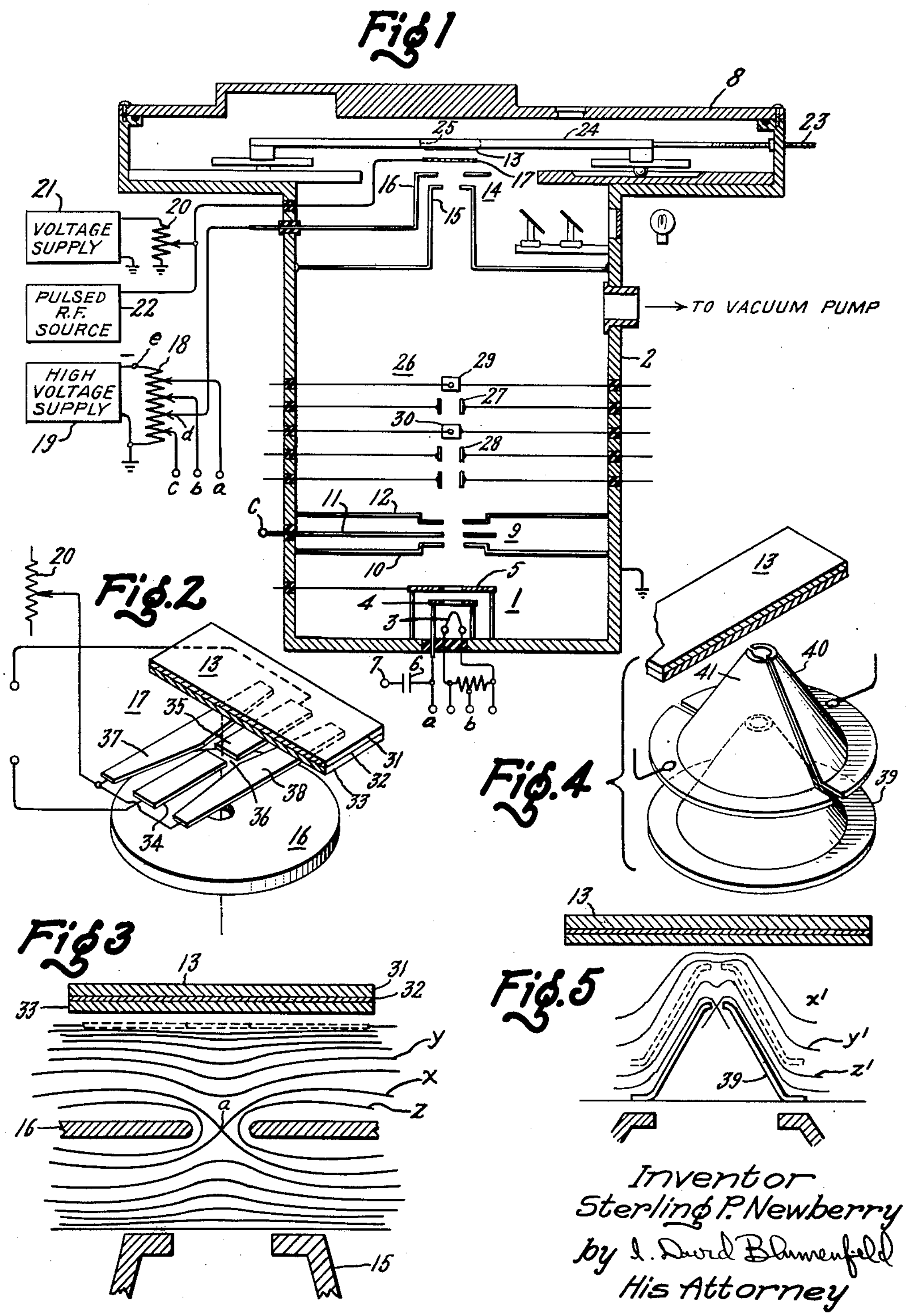
FIGURE 1 illustrates, partially in cross-section, an information storage assembly embodying the invention.
FIGURE 2 is a partial perspective of a composite objective lens assembly useful with the storage system of FIGURE 1.
FIGURE 3 is a schematic showing of the electrostatic field produced by the lens assembly of FIGURE 2.
FIGURE 4 is a perspective view of an alternative embodiment of a lens assembly useful with the apparatus of FIGURE 1.
FIGURE 5 is a schematic showing of the electrostatic field produced by the lens assembly of FIGURE 4.

A thermoplastic information storage system illustrating the invention is shown in FIGURE 1 of the drawing, wherein an electron beam source is provided in the form of an electron gun assembly 1 retained in the lower portion of an evacuated housing 2. Electron gun 1 comprises an electron emitting filament 3 and apertured control and accelerating electrodes 4 and 5, having their apertures aligned over the filament to form and accelerate the electrons into flat beam of electrons. Heater current and operating potential for the filament 3, as well as the electrodes 4 and 5, is provided in a well known fashion by connection to a filament current transformer, not shown, and to appropriate taps *a* and *b* of a suitable high voltage supply 19.

The control electrode 4 is also connected through a coupling capacitance 6 to an input terminal 7 which receives negative blanking pulses from a utilization circuit such as a computer, to cut off the beam when the thermoplastic element is heated.

Access to the interior of the housing 2 may be had by removing a cover plate 8 fastened in vacuum tight relation to the upper end of the housing by any suitable fastening means. The housing itself is evacuated of gases and vapors by a suitable pumping system, not shown, through the illustrated exhaust port.

Positioned directly above the electron gun 1 is a beam collimating device 9, comprising three apertured electrostatic field producing plates 10, 11, and 12 having their central aperture aligned along the beam path. The collimating device 9 modifies the trajectories of the electrons to convert the slightly diverging electron beam from the gun assembly into a beam of parallel or slightly converging electrons.

Operating potential for the collimating device 9 is provided by connecting the central plate 11 to the negative terminal C of the high voltage supply 19, and grounding the plates 10 and 12 to the housing 2. An electrostatic field is thus produced which modifies the electron trajectories in their passage through the apertures to produce a beam of parallel or slightly converging electrons. By virtue of this effect, the collimating assembly 14 is known as an electrostatic condenser lens.

Positioned at the opposite end of the housing, away from the electron gun assembly 1, is a means which alternately focusses the electron beam on a thermoplastic storage element 13 and supplies heating energy thereto, so that writing and heating occurs substantially at the same physical location. Thus, an electrostatic objective lens assembly 14 is positioned along the beam path and adjacent to the storage element to provide an electrostatic field to focus the beam on the surface of the thermoplastic storage element, substantially reducing its cross-sectional area. The lens includes a pair of radio frequency electrodes to which radio frequency voltage is periodically applied to provide heating of selected areas of thermoplastic material. This objective lens assembly comprises a first pair of apertured field producing elements 15 and 16, which produce the desired electrostatic field to focus the electron beam. A combination lens and heating electrode element 17 is positioned within the lens field between the apertured element 16 and the thermoplastic storage element 13, and includes a pair of spaced electrodes disposed along the beam path to produce a radio frequency heating gap. The lens element is so shaped and so positioned to coincide with one of the equipotential surfaces of the lens field and, hence, does not distort the field and affect the focusing action of the lens.

Operating potential for the apertured lens elements 15 and 16 is provided by grounding the former to the housing 2 and connecting the latter to tap *d* on a voltage dividing resistance 18, connected between the negative terminal *e* of the high voltage supply 19 which also supplies operating potential for electron gun 1 and condenser lens 9. The electrode lens element 17 is connected to the movable tap of a voltage dividing resistance 20, connected across the output terminals of a voltage supply 21, shown in block diagram form. The tap on the voltage divider 20 is adjusted to apply a direct current voltage to the element 17 of a magnitude to maintain its potential equal to the equi-potential surface to which it conforms.

A pulsed source of radio frequency energy 22, such as a pulsed RF oscillator, shown in block diagram form, is also connected to the electrodes 17 to provide radio frequency energy for heating purposes.

Positioned at the focal point of the lens assembly 14 is a thermosplastic storage element 13 retained in a storage element positioning means 22 which permits positioning of the storage element in two mutually perpendicular planes by means of threaded push rods 23, only one of which is shown, extending through housing 2. The positioning means comprises a shallow, inverted U-shaped holder 24, having an opening 25 for retaining the storage element. The holder 23 may thus be selectively positioned in two perpendicular directions to expose selected areas of the thermoplastic material to the electron beam.

Positioned along the beam path between the condenser and objective lenses is a deflection system 26 which positions the beam in space and produces scanning of the beam over the storage element 13 to store the information. The deflection system comprises horizontal deflection plate pairs 27 and 28 and corresponding vertical deflection plate pairs 29 and 30. The horizontal and vertical deflection voltages are simultaneously applied to the individual vertical and horizontal plate pairs in polarity opposition to produce double deflection of the beam to insure that the beam passes through the center of the objective lens assembly for all scan positions. That is, the electron beam is bent in opposite directions by each pair of plates to produce a resultant trajectory, causing the beam to pass through the center of the objective lens assembly for all beam scan positions. Otherwise, the electron beam would pass through the periphery of the lens aperture at scan positions away from the lens optical axis, producing spherical aberration effects. Such effects, which may be defined as the separation of the lens focal planes for electrons passing through various portions of the lens away from the optical axis, produce beam diameter variations with scan position resulting in undesired variations of the deformation spacing.

The deflection voltages applied to the respective plates 27, 28, etc., are sawtooth time varying voltages which produce, in a well known manner, an area scan of the electron beam over the thermoplastic. In addition, the electron beam is velocity modulated in the horizontal plane so that the constant current beam is allowed to dwell longer in some positions than others, thus producing successive areas of high and low electron density. The velocity modulation is achieved by superimposing a high frequency modulating voltage on the horizontal sawtooth which varies the beam velocity. By varying the frequency of the modulating voltage the velocity of the beam is varied correspondingly, changing the spacing between the areas of high electron density, thus varying the spacing of the physical deformation produced in the thermoplastic from the deposited electrons.

The thermoplastic storage element 13, referred to briefly above, may be seen most clearly with reference to FIGURE 2, which is a partial perspective of the storage element and the objective lens assembly of FIGURE 1. The storage element comprises a base material 31 which is optically clear, smooth, and non-plastic at temperatures up to at least 150° C. One suitable material for the base is an optical grade of polyethelene terphthalate sold under the trade name Cromar. Similarly, an optically clear plastic sold under the trade name Mylar is also suitable for use as a base material. A thin conducting substrate 32 of cuprous iodide (CuI) is positioned between the base material, and a film of thermoplastic material 33 which is exposed to the electron beam. The layer of cuprous iodide heats the thermoplastic by currents induced from a radio frequency field and is optically transparent to transmit light during read out of the stored information in the thermoplastic layer.

The thermoplastic layer 33, upon which the desired deformation patterns are formed, must be optically clear, radiation resistant, of high resistivity, and substantially infinitely viscous at room temperature and of relatively low fluid viscosity at a temperature of 100 to 150° C. One satisfactory thermoplastic material satisfying all of the above requirements is a blend of polystyrene, m-terphenyl, and a copolymer of 95 weight percent of butadiene and 5 weight percent styrene. Specifically, the composition may be 70% polystyrene, 28% m-terphenyl and 2% of the copolymer.

The storage element may be prepared by first applying a thin film of metallic copper to the surface of the base material 31 and then immersing the copper coated material in an iodide vapor to form the cuprous iodide film. For a more detailed description of the method and apparatus for producing this cuprous iodide film, reference is made to Patent No. 2,756,165, entitled "Electrically Conducting Films and Process for Forming the Same," D. A. Lyon, issued July 24, 1956.

After formation of the cuprous iodide layer, the thermoplastic film 33 is deposited by forming a 10% solid solution of the blend in toluene and coating the cuprous iodide layer with this solution. The toluene is evaporated by air drying and by pumping in vacuum to produce the final composite article having the thermoplastic film on the surface. The film thickness of the thermoplastic may vary from about .01 mil to several mils, with the preferred thickness being approximately equal to the spacings between the deformations formed in the surface thereof. The deformable thermoplastic tape per se as described above, forms no part of the present invention and is the invention of William E. Glenn, Jr., and is described and claimed in the aforementioned Glenn applications.

As was pointed out briefly above with reference to the apparatus for FIGURE 1, the objective lens assembly 14 performs a dual function, that of focussing the electron beam onto the storage element to reduce its cross-sectional area, as well as providing radio frequency heating of selected areas of the thermoplastic to either develop the deformation pattern from the electrons deposited on the surface, or to erase previously stored deformation patterns. The objective lens assembly 14, which may be seen most clearly in FIGURE 2, is positioned adjacent to the thermoplastic storage element 13 and comprises a pair of field producing plane, circular, apertured plates 15 and 16, only the latter of which is shown, and the heating element 17. The RF heating element 17 comprises a pair of rectangular spaced electrodes 34 and 35 forming an RF gap 36 along the beam path, inducing a circulating current in the cuprous iodide layer of the thermoplastic storage element to produce the desired heating at the same location at which the electrons are deposited.

Positioned on either side of the RF electrodes are a pair of wedge-shaped metallic elements 37 and 38 which minimize distortion of the field due to the finite thickness of the electrodes. That is, since the electrodes 34 and 35 are of finite thickness, they cannot be absolutely coincident with the geometric equi-potential plane, tending to cause some distortion of the field. By providing two additional elements 37 and 38 adjacent to the radio frequency electrodes, this distortion in the vicinity of the electron beam path is minimized since the effective area of the electrodes is increased by providing a substantial continuous metallic surface near the beam axis without, at the same time, enlarging the radio frequency gap and, hence, the area of heating.

FIGURE 3 illustrates schematically the potential distribution in an objective lens assembly of the type illustrated in FIGURES 1 and 2. FIGURE 3 shows the apertured entrance and high voltage central elements 15 and 16, and a plastic storage element 13 having a cuprous iodide metallic layer 32 which, being substantially at ground potential, constitutes a closed exit element for the lens field. The lines X, Y, Z, etc., illustrate the lens field equi-potential surfaces which extend into and out of the paper. As can be observed from this figure the equipotential surfaces intersect in the aperture of the element 16 at a saddle point. Moving toward the element 13 and away from the center of the aperture, the equi-potential surfaces become less and less convoluted until close to the surface of the element 13 they approach a plane surface. If a metallic lens element is to be inserted between the member 16 and the thermoplastic storage element without distorting the lens field and the equi-potential surfaces it is necessary that this element (i.e., the radio frequency electrodes) coincide in space with one of these surfaces and be maintained at the same potential as the surface. Thus, for simplicity of construction and operation, the radio frequency heating electrodes 34 and 35 are positioned closely adjacent to the thermoplastic storage element and coincident with an equi-potential surface which is substantially a plane surface, as indicated by means of the dashed lines showing the electrodes 34 and 35 in phantom. Thus, during the beam writing, i.e., when the electron beam deposits electrons on the surface of the thermoplastic in a predetermined pattern, the electrodes act as one of the lens elements and do not affect the lens field.

The composite objective lens assembly of FIGURES 1 and 2 utilizes generally planar lens elements. This construction is preferable in many circumstances since fabrication is relatively simple. However, it may be desirable in certain circumstances to utilize more complex lens structures to produce different field configurations. FIGURE 4 illustrates such an arrangement wherein a composite objective lens assembly is provided which produces a convex outwardly extending field approaching the thermoplastic storage element at a single point. To this end, an apertured central lens element 39 produces a field in conjunction with an entrance element, not shown for the sake of simplicity of illustration. Positioned between the apertured element 39 and the thermoplastic storage element 13 are a pair of radio frequency heating electrodes 40 and 41 which are so positioned and shaped to conform with one of the equi-potential surfaces of the lens field. Consequently, the radio frequency electrodes 40 and 41 are generally conical and produce at the apex thereof a concentrated radio frequency field useful in heating the thermoplastic storage element.

Referring to FIGURE 5, a schematic illustration of the lens field 4 is illustrated. It is apparent from this figure that the equi-potential surfaces produced by the lens, and illustrated by the lines X′ Y′ Z′, etc., like the lens elements themselves have a conical shape. The R.F. electrodes, illustrated in phantom by means of the dotted lines, must therefore be conical in shape and so positioned as to be coincident with one of these equipotential surfaces. In that event, the presence of the conically shaped heating electrodes 40 and 41 does not distort the lens field during the writing operation.

Figure 6:
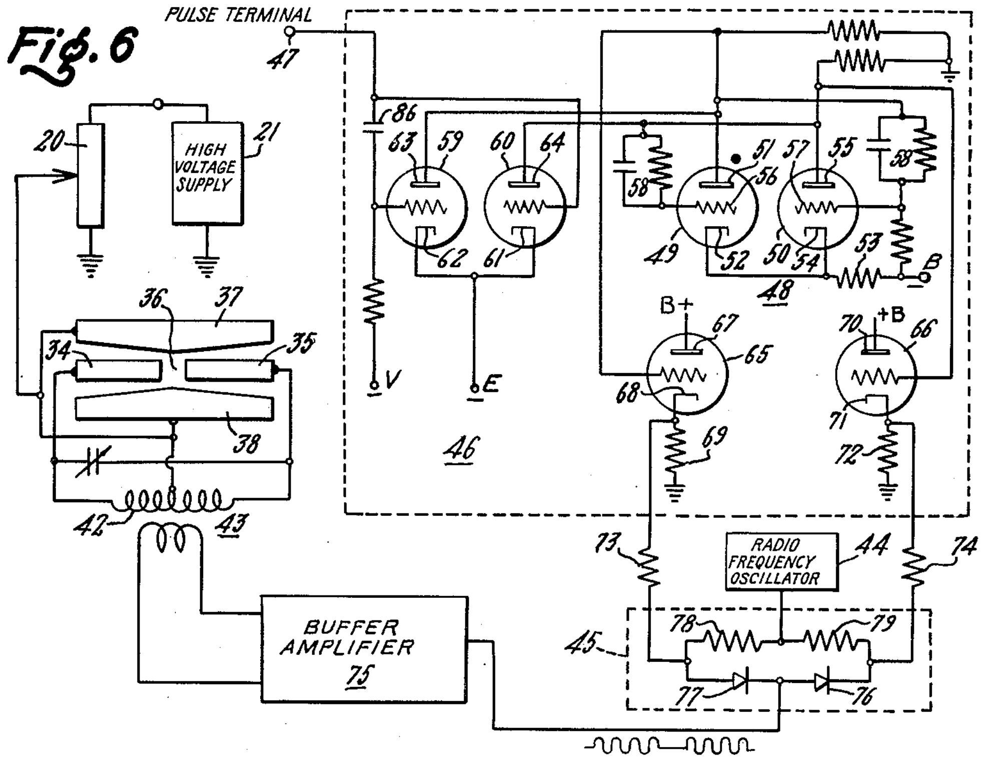
FIGURE 6 is a schematic circuit diagram of a pulsed radio frequency source.

As has been pointed out previously, particularly with reference to FIGURE 1, the heating electrodes of the composite objective lens assembly have radio frequency voltage applied thereto periodically to produce a radio frequency heating field across the gap 36 including heating current flow in the cuprous iodide layer of the thermoplastic storage element. FIGURE 6 is a schematic circuit diagram of such a pulsed radio frequency source. The R.F. voltage is supplied to the heating electrodes 34 and 35 from a tuned resonant secondary winding 42 of a suitable transformer 43. A center tap on the transformer secondary 42 is connected to each of the wedge shaped electrode elements 37 and 38 and to a movable tap on the voltage dividing resistance 20 of a voltage supply 21. It is apparent from the description so far that all of the heating electrode elements 34, 35, 37, and 38 are connected to the adjustable voltage divider 20 through the secondary winding 42 to maintain them at a direct current potential which may be adjusted to coincide with the equi-potential surface to which the elements conform.

Radio frequency energy is periodically coupled into the resonant secondary of the transformer 43, from a radio frequency oscillator gated directly from a utilization device such as a computer. To this end, high frequency energy from a free running oscillator 44 is applied periodically to the transformer 43 through a gate 45 which is opened by a gating signal from a gate control circuit 46, shown in the dashed rectangle, operated in response to command pulses from a computer or the like.

Command pulses from a computer are applied to an input terminal 47 of the gate circuit 46 to control a bistable device to produce the gating signal. The bistable device is shown as a bistable multivibrator 48 comprising a pair of space discharge devices 49 and 50, such as vacuum triodes. The anode 51 of triode 49 is connected through a suitable load resistor to a source of reference potential such as ground, and the cathode 52 through a resistor 53 to a source of negative potential with respect to ground indicated at —B, while the cathode 54 of triode 50 is similarly connected through the common cathode resistor 53 to the source of negative potential. The anode 55 of triode 50, is also connected through a suitable anode resistor to a source of reference potential such as ground. The anodes 51 and 55 of the two triodes are connected to the control electrodes 57 and 56 of their complementary triodes, through similar parallel resistance-capacitance circuits 58 to control the reversal of the stable conducting states of the individual tubes.

A pair of triggering elements 59 and 60 are provided to transmit negative pulses selectively to the triodes 49 and 50 to reverse their conducting states. The triggering elements comprise individual triode space discharge devices which have their cathodes 61 and 62 connected to a common source of negative potential, indicated at —E, and their anodes 63 and 64 connected respectively to the anode of triodes 49 and 50. The control grids of the triggering devices are connected through a coupling capacitor 86 to the pulse input terminal 47 and to a source of biasing potential indicated at —V and are thus normally non-conducting by virtue of this biasing voltage —V. Appearance of a positive command pulse at the input terminal 47, causes triggering devices 59 and 60 to conduct, transmitting negative pulses to the anodes of the triodes 49 and 50 of multivibrator 48. These negative pulses are applied through the parallel circuits 58 and 59 to the control electrodes 56 and 57. Whichever of the triodes 49 and 50 is conducting upon arrival of the negative pulse is brought to a non-conducting state and, by virtue of the multivibrator connection, reverses the previous stable conducting states causing the other triode to conduct. The bistable circuit 48 remains in this new state until the arrival of the next command pulse which again causes it to reverse its conducting state.

Initially, the condition of multivibrator 48 is such that triode 49 is conducting, and triode 50 is non-conducting. Thus, the anode potential of triode 49 is negative with respect to ground because of the flow of anode current, while that of triode 50 is substantially at ground potential. The anodes of triodes 49 and 50 are connected through suitable leads to the control electrodes of a pair of cathode follower amplifiers 65 and 66. The cathode follower 65 comprises a triode space discharge device having an anode 67 connected directly to a source of positive potential B+ and its cathode 68 connected to a source of reference potential such as ground through a cathode load resistor 69. The cathode follower 66 similarly comprises a triode space discharge device having an anode 70 connected directly to a source of positive potential, indicated at B+, and its cathode 71 to ground through a cathode load resistor 72.

Thus, initially, the cathode follower 65 has a negative voltage relative to ground applied thereto from the anode of triode 49 causing it to be non-conductive and maintaining its cathode 68 substantially at ground potential. The control electrode of the other cathode follower 66, on the other hand, is substantially at ground potential, being connected to the anode of non-conducting triode 50, causing it to conduct and maintaining cathode 71 at positive potential relative to ground by virtue of the current flow through and the potential drop across its cathode load resistor 27.

The potentials at the cathodes of the respective cathode followers 65 and 66 are utilized as a gating voltage and are applied through a pair of suitable resistors 73 and 74 to a diode gate bridge 45 to open and close the gate, coupling high frequency oscillatory energy from an oscillator 44, indicated in block diagram form, to a buffer amplifier 75 and thence to the transformer 43.

The diode gate 45 comprises a pair of diode rectifiers 76 and 77 connected as the arms of a bridge circuit with a pair of resistors 78 and 79 comprising the remaining bridge arms. The junction of the resistors 78 and 79 is connected to the output of the continuously running output oscillator 44 while the junction of the diodes 76 and 77 is connected to the input of the buffer amplifier 75. The remaining bridge terminal pair is connected respectively through the resistances 73 and 74 to the cathode followers 65 and 66. The diodes 76 and 77 are so poled that they will conduct only if a relatively positive potential is applied to the junction of diode 77 and the resistance 78 and a relatively negative potential to the junction of diode 76 and the resistance 79 opening the gate and transmitting oscillatory energy from the crystal oscillator 44 to the buffer amplifier 75.

It is apparent from the preceding description that prior to the application of the first heat command pulse to terminal 47, diode gate 45 is closed since triode 49 is conducting and its anode potential maintains the cathode follower 65 non-conducting. Consequently, the cathode 68 is at ground potential as is the function of the diode 77 and the resistor 78. Similarly, the triode 50 is non-conducting and its anode potential causes cathode follower 66 to conduct heavily. As a result, the cathode 71 is positive with respect to ground because of the current flow through and the voltage drop across the cathode resistor 72. As a result, the junction of the diode 76 and the resistance 79 is also positive with respect to ground and both are non-conducting and the gate 45 is closed, blocking transmission of oscillatory energy from the oscillator 44 to the transformer and heating electrodes.

Upon the appearance of a positive heat command pulse at the input terminal 47, the conducting conditions of the triodes 49 and 50 is reversed with triode 49 non-conducting and triode 50 conducting. The anode potential of triode 49 rises to ground potential, causing the cathode follower 65 to conduct and raising the potential of its cathode to a positive value with respect to ground and applying a positive potential to the junction of the diode 77 and the resistance 78. Similarly, the anode potential of triode device 50 falls to a value negative with respect to ground terminating current flow in cathode follower 66, lowering the potential at its cathode substantially to ground and correspondingly reducing the potential at the junction of diode 76 and resistance 79 to ground. The diodes 76 and 77 now conduct, opening the gate 45 and permitting oscillatory energy from the crystal oscillator 44 to pass through the buffer amplifier 75 to the primary of the transformer 43, thus applying the radio frequency oscillatory energy to the heating electrodes 34 and 35.

At some time later, a second positive command pulse from the computer is applied to the pulse input terminal 47 and reverses the conducting condition of the triodes 49 and 50 again closing the gate 45. As a consequence, no oscillatory energy is coupled to the transformer 43 and the heating portion of the operating cycle ceases. In this fashion, oscillatory high frequency energy is periodically coupled to the heating electrodes in response to command signals from the utilization device such as a computer. The heating electrodes thus alternately function as an element of the objective lens assembly 14 during writing and as a radio frequency heating element during heating or erase by the application of this pulsed oscillatory energy.

Figure 7:
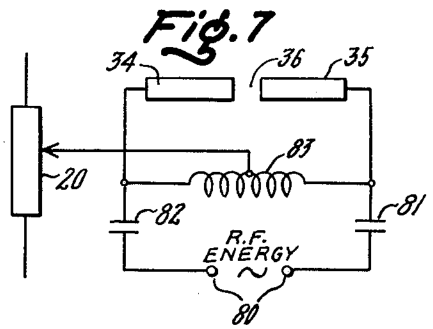

In the circuit arrangement illustrated in FIGURE 6, a transformer 43, having a tuned secondary, is disclosed as the means for coupling the oscillatory energy into the heating electrodes 34 and 35. It is, of course, possible to couple the oscillatory energy directly to the heating electrodes, eliminating the necessity for a transformer. FIGURE 7 illustrates one such arrangement adapted to couple the energy directly to the electrodes. Thus, there is illustrated a pair of terminals 80 to which the oscillatory energy is applied from a circuitry of the type illustrated in FIGURE 6. The oscillatory energy is applied to the heating electrodes 34 and 35 from the terminals 80 by means of a pair of suitable coupling capacitors 81 and 82. Connected in shunt with the heating electrodes is an inductance 83 which provides a high impedance path for the radio frequency energy but a low impedance path for direct current. The heating electrodes 34 and 35, as well as the remaining electrode elements, are connected to a source of direct voltage potential through a center tap on the inductance 83 through the movable slider of a voltage dropping resistance 20 connected to a suitable source of operating voltage. Voltage dropping resistance 20, in a manner similar to that described above, adjusts the potential of these elements to coincide with the equal potential surface to which they conform.

Figure 8:
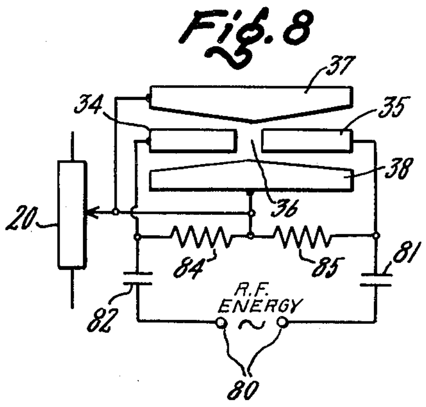
FIGURES 7 and 8 are alternative embodiments of heating electrode coupling circuits.

FIGURE 8 illustrates yet another alternative embodiment of a coupling arrangement for applying the high frequency oscillatory energy to the heating electrodes. This arrangement is substantially similar to that one shown in FIGURE 7 with the exception that a pair of series connected high resistances 84 and 85 are connected in shunt across the heating electrodes 34 and 35. In all other manners the circuit is identical in construction with that illustrated in FIGURE 7. In this manner, the inductance 83 of FIGURE 7 is replaced by a pair of high resistances on the order of 100,000 ohms each. Thus, these resistances function in the same manner as the inductance in offering a high A.-C. resistance to the oscillatory energy while yet acting as a potential divider for these elements for maintaining the direct current potential level.

In the previous discussion of the instant invention, the heating and erasing and writing on the thermoplastic storage element has been achieved by means of a composite lens structure containing an element which functions both as a lens element and a heating electrode.

It is possible, however, to achieve the same results by eliminating this additional lens element and applying the R.F. energy directly to one of the field producing apertured element, such as elements 15 and 16 of FIGURE 2. It must be realized, however, that should that be done, it becomes necessary to split the central element in order to achieve the necessary radio frequency gap during the heating portion of the cycle. Furthermore, complications may arise because of the necessity of removing the high negative field producing potential from the central electrode prior to the application of the R.F. field. All of these things are pointed out in order to make clear that the instant invention is not limited to a compound lens structure containing an element in addition to the field forming element, but may be carried out by actually utilizing one of the field producing elements as the radio frequency heating electrodes. However, for the reasons pointed out, the preferred approach is that disclosed in FIGURES 1, 2, and 3, where separate elements are inserted to produce the radio frequency heating which elements are part of the lens assembly and are so positioned and shaped as to coincide with the equal potential surfaces of the lens.

Thus, it is clear that a thermoplastic storage system has been disclosed which makes it possible to write by means of the electron beam, heat to develop deformation patterns from the electrons deposited on the thermoplastic by the beam, and erase deformations present on the thermoplastic, all at the same physical position. That such a system is advantageous, in that it simplifies the operation, increases the speed and accuracy, will be immediately apparent.

While particular embodiments of this invention have been shown, it will, of course, be understood that it is not limited thereto since many modifications in the instrumentality employed may be made. It is contemplated by the appended claims to cover any such modifications as fall within the true spirit and scope of this invention.

What I claim as new and desire to secure by Letters Patent in the United States is:

1. In a storage system of the type having a deformable storage medium adapted to have information stored thereon in the form of physical deformations and has a charged particle writing beam source for producing a charge pattern on the surface of the storage medium, and a radio frequency energy source for supplying heating energy to said storage medium to produce deformations therein from the charge pattern, the improvement which comprises, a field producing lens structure positioned along said beam path for focusing the beam on said storage medium, said lens structure including means for periodically applying radio frequency energy from said source to said storage medium to heat selected portions thereof so that writing and heating occurs substantially at the same location.

2. In a storage system of the type having a deformable storage medium adapted to have information stored thereon in the form of physical deformations and has a charged particle writing beam source for producing a charge pattern on the surface of the storage medium and a radio frequency source for supplying heating energy to said storage medium to produce deformations therein from the charge pattern, the improvement which comprises a lens structure disposed along said beam path to produce an electrostatic field for focusing said beam on said medium, one of said lens elements being coupled to said radio frequency source for periodically applying radio frequency energy from said source to selected portions of said storage medium so that writing and heating occur substantially at the same location.

3. In a storage system of the type having a deformable storage medium adapted to have information stored thereon in the form of physical deformations and has a charged particle writing beam source for producing a charge pattern on the surface of the storage medium and a radio frequency source for supplying heating energy to said storage medium to produce deformations therein from the charge pattern, the improvement which comprises apertured field producing lens elements disposed along said beam path and including spaced electrodes coupled to said radio frequency source and positioned within the lens field for periodically applying radio frequency energy to said storage medium, said electrodes being positioned to coincide with an equi-potential surface of the electrostatic field.

4. In a storage system of the type having a deformable storage medium adapted to have information stored thereon in the form of physical deformations and has a charged particle writing beam source for producing a charge pattern on the surface of the storage medium and a radio frequency source for supplying heating energy to said storage medium to produce deformations therein from the charge pattern, the improvement which comprises a compound lens assembly positioned along the beam path for selectively focusing said beam on said storage element and coupling radio frequency energy thereto, said lens assembly including lens elements for producing an electrostatic beam focusing field, one element of said lens comprising a pair of radio frequency heating plates connected to said radio frequency source positioned to coincide with an equi-potential surface of the lens field.

5. In a storage system of the type having a deformable storage medium adapted to have information stored thereon in the form of physical deformations and has a charged particle writing beam source for producing a charge pattern on the surface of the storage medium and a radio frequency source for supplying heating energy to said storage medium to produce deformations therein from the charge pattern, the improvement which comprises apertured electrostatic field producing plates disposed along said beam path and forming an objective lens assembly to focus said beam on said storage medium, and substantially planar radio frequency electrodes adapted to have radio frequency energy impressed thereon from said radio frequency source, said electrodes being positioned between the apertured plates and said storage medium within the lens field and being substantially coincident with an equi-potential surface of said field.

6. In a storage system of the type having a deformable storage medium adapted to have information stored thereon in the form of physical deformations, a charged particle writing beam source for producing a charge pattern on the surface of the storage medium and a radio frequency source for supplying heating energy to said storage medium to produce deformations therein from the charge pattern, the improvement which comprises a compound lens assembly including apertured electrostatic field producing plates disposed along said beam path and forming an objective lens for focusing said beam, said plates being shaped to produce an outwardly convex field, and radio frequency heating electrodes positioned within the lens field and substantially coincident with an equi-potential surface of the said field, said electrodes constituting a portion of said compound lens assembly whereby writing and heating of said medium occur substantially at the same location.

7. In a storage system of the type having a deformable storage medium which is adapted to have information stored thereon in the form of physical deformations, a charged particle writing beam source for producing a charge pattern on the surface of the storage medium and a radio frequency source for supplying heating energy to said storage medium to produce deformations therein from the charge pattern, the improvement which comprises a compound lens means positioned along the beam path to modify the trajectory of said beam for focusing it on said target and periodically applying energy from said radio frequency source to said storage medium, including apertured generally conical field producing elements forming an objective lens and producing an outwardly convex field for focusing said beam, and radio frequency electrodes forming a part of said lens assembly and positioned within the lens field substantially coincident with an equi-potential surface of said field.

8. In a storage system according to claim 7 wherein said heating electrodes are generally conically shaped, an electron lens assembly having a plurality of apertured lens element for producing a field in space for affecting the trajectory of an electron beam to bring it to focus, the improvement which comprises a pair of spaced electrodes positioned within the lens field and constituting a portion of the lens, said spaced electrode being so formed as to be coincident with an equi-potential surface of the field whereby said electrodes function alternately as a lens element and as radio frequency electrodes when radio frequency energy is impressed thereon.

References Cited in the file of this patent

UNITED STATES PATENTS

| | | |
|---|---|---|
| Re. 22,734 | Rosenthal | Mar. 19, 1946 |
| 2,281,637 | Sukumlyn | May 5, 1942 |
| 2,391,450 | Fischer | Dec. 25, 1945 |
| 2,449,752 | Ross | Sept. 21, 1948 |